US009827725B2

(12) United States Patent
Yang et al.

(10) Patent No.: US 9,827,725 B2
(45) Date of Patent: Nov. 28, 2017

(54) TIRE DIRECT-PRESSURE SHAPING AND ELECTROMAGNETIC INDUCTION HEATING CURING METHOD AND APPARATUS

(71) Applicants: TRIANGLE TYRE CO., LTD., Weihai (CN); BEIJING UNIVERSITY OF CHEMICAL TECHNOLOGY, Beijing (CN)

(72) Inventors: Weimin Yang, Beijing (CN); Jinyun Zhang, Beijing (CN); Yuhua Ding, Weihai (CN); Tao Zhang, Weihai (CN); Zhiwei Jiao, Beijing (CN); Xiaoying Liu, Beijing (CN); Hua Yan, Beijing (CN)

(73) Assignees: TRIANGLE TYRE CO., LTD., Weihai, Shandong (CN); BEIJING UNIVERSITY OF CHEMICAL TECHNOLOGY, Beijing (CN)

( * ) Notice: Subject to any disclaimer, the term of this patent is extended or adjusted under 35 U.S.C. 154(b) by 0 days.

(21) Appl. No.: 15/635,696

(22) Filed: Jun. 28, 2017

(65) Prior Publication Data
US 2017/0297229 A1 Oct. 19, 2017

Related U.S. Application Data

(62) Division of application No. 14/432,056, filed as application No. PCT/CN2013/080086 on Jul. 25, 2013.

(30) Foreign Application Priority Data

May 28, 2013 (CN) .......................... 2013 1 0204881

(51) Int. Cl.
*B29D 30/00* (2006.01)
*B29D 30/06* (2006.01)
(Continued)

(52) U.S. Cl.
CPC .......... *B29D 30/0605* (2013.01); *B29C 33/02* (2013.01); *B29C 35/0805* (2013.01);
(Continued)

(58) Field of Classification Search
CPC .................................................. B29D 30/0605
(Continued)

(56) References Cited

U.S. PATENT DOCUMENTS

2009/0308861 A1 12/2009 Okada et al.
2012/0074133 A1 3/2012 Fujieda et al.

FOREIGN PATENT DOCUMENTS

CN   101511557 A   8/2009
CN   102470563 A   5/2012
(Continued)

OTHER PUBLICATIONS

International Search Report dated Feb. 27, 2014 issued in corresponding application No. PCT/CN2013/080086.

*Primary Examiner* — Timothy Kennedy
(74) *Attorney, Agent, or Firm* — Westerman, Hattori, Daniels & Adrian, LLP (57) ABSTRACT

A tire direct-pressure shaping and electromagnetic induction heating curing method uses an inner metal mold including large and small segments, a telescoping mechanism, supporting plates attached to the segments, and induction heating coils. A cavity in the middle of the segments is filled of phase change material. The temperature of the mold rises rapidly by the thermal effect of an eddy current generated on the surface of the segments to heat the green tire. When the middle part of the segment is heated to a certain temperature, the phase change material absorbs and stores the excess heat. Therefore, the temperature of the middle part of the segment differs from one of two ends of the segment. Once the tire is cured, the inner mold in the expanded condition and the
(Continued)

outer mold support very high pressure for the green tire together.

2 Claims, 11 Drawing Sheets

(51) Int. Cl.
*B29C 35/08* (2006.01)
*B29C 33/02* (2006.01)
(52) U.S. Cl.
CPC .. *B29D 30/0662* (2013.01); *B29C 2035/0811* (2013.01); *B29D 2030/0674* (2013.01); *B29D 2030/0677* (2013.01)
(58) Field of Classification Search
USPC .......................... 425/35, 40, 41, 42, 50, 327
See application file for complete search history.

(56) References Cited

FOREIGN PATENT DOCUMENTS

| | | |
|---|---|---|
| CN | 102658618 A | 9/2012 |
| JP | 2006-103106 A | 4/2006 |
| JP | 2006-224417 A | 8/2006 |
| KR | 2002-0070528 A | 9/2002 |

Fig. 10

TIRE DIRECT-PRESSURE SHAPING AND ELECTROMAGNETIC INDUCTION HEATING CURING METHOD AND APPARATUS

CROSS-REFERENCE TO RELATED APPLICATION

The present application is a Divisional of U.S. patent application Ser. No. 14/432,056, filed on Mar. 27, 2015, which is a national stage application filed under 35 USC 371 of International Application No. PCT/CN2013/080086, filed Jul. 25, 2013, and which is based upon and claims the benefit of priority from the prior Chinese Patent Application No. 201310204881.4, filed on May 28, 2013, the entire contents of which are incorporated herein by reference.

FIELD OF INVENTION

This invention relates to tire manufacturing and particularly to a tire direct-pressure shaping and electromagnetic induction heating curing method and apparatus

BACKGROUND OF INVENTION

It is well-known that curing is a key procedure in tire manufacturing process. In this procedure, the present curing method is that the curing bladder and the outer mold are used together to support pressure and heat for the green tire. Cross-linking reaction takes place between compound and vulcanizing agent at this condition, which eventually gives tire good performance and pattern. Compared with the early water bag shaping method, bladder shaping method is widely used in the manufacture of tires due to its high heat transfer efficiency, but this method has some faults still, such as:

Firstly, curing bladder shows often an incomplete or asymmetric structure owing to viscose and unreasonable design, which results in uneven mass distribution of the cured tire, On the other hand, the mass distribution of the green tire is also uneven by the influence of building precision. But, the flexible bladder which provides low pressure cannot make compound distributes evenly again during curing. As a result, the balance and uniformity of the completed product is low.

Secondly, the curing process needs to consume large amounts of steam or superheated water, but a small part of these thermal medium is absorbed by tire, and most of them is consumed in invalid pipeline loops which causes serious energy waste.

Thirdly, as is known, temperature and pressure of steam is associated with each other. They cannot be controlled individually. So, curing temperature is often low when curing pressure is suitable. This problem is solved by prolonging curing time generally. But, it reduces productivity.

Fourthly, the shoulder and bead of tires are more difficult to cure than other parts. Therefore, they need more heat to reach the plateau of vulcanizing curves. However, in the actual curing process, steam in the bladder transfers heat to the whole green tire uniformly, and each part acquires the same heat energy. Therefore, the crown and sidewall of tires have been over cured severely when the shoulder and bead reach the plateau of vulcanizing curves, which greatly degrade performance of the tire.

In recent years, nitrogen curing technology is developed based on the principle of constant pressure and variable temperature. Although this technology obviously saves energy and improves the curing efficiency, it brings a problem, which is that steam will be condensed and deposited in the bottom of bladder when nitrogen is injected into bladder. And, it cause the temperature difference between upper and low sidewalls. So curing quality of tire is low.

The references numbers refer to the following:
1. the small segment of inner mold
2. the upper connecting rod of telescoping mechanism of small segment
3. the inner axle sleeve
4. the outer axle sleeve
5. clamping ring
6. bolt
7. axle-end ring
8. positioning pin
9. the upper connecting rod of telescoping mechanism of large segment
10. the large segment of inner mold
11. melt pressure sensor
12. supporting plate for large segment
13. the low connecting rod of telescoping mechanism of large segment
14. the short connecting rod of telescoping mechanism of large segment
15. copper sleeve
16. base
17. piston
18. the short connecting rod of telescoping mechanism of small segment
19. the low connecting rod of telescoping mechanism of small segment
20. supporting plate for small segment
21. thermocouple
22. phase change material
23. "|" shaped core
24. silica gel
25. insulation layer a
26. electromagnetic induction coil a 27. shell
28. "U" shaped core
29. electromagnetic induction coil b
30. insulation layer b
31. outer mold
32. cover
33. green tire
34. steel ring below

SUMMARY OF THE INVENTION

The purpose of the present invention is to provide an energy saving, short curing time and high precision curing method and apparatus of tires.

The curing method of the present invention is to use a metal inner mold to replace the bladder of the central mechanism in the tire vulcanizer. The inner mold comprises large segments, small segments, telescoping mechanism and the supporting plates which are attached to segments of the mold. The large segments and the small segments which are alternately arranged in the circumferential direction can expand and contract in the radial direction driven by the telescoping mechanism. The outer contour line of each segment of mold is consistent with the inner contour line of the finished tire. When curing, the mold is in the expanded state, so the large segments and the small segments fit closely together to form a complete circle whose outer diameter is equal to the inner diameter of the finished tire in shape. While unloading, the large segments and the small segments of the mold contract asynchronously, eventually all small segments contract to be within inner circle and the large segments contract to be within the outer circle, wherein the inner circle diameter<the outer circle diameter≤the bead diameter of finished tire, cavity with a certain depth is cut in the middle of the segment. Cavity is filled with PCM. An electromagnetic induction heating method is used to heat the segments of the inner mold. Two sets of electromagnetic coils which have same inductance are mounted at the back of each segment. The electromagnetic coils which wind in the longitudinal direction of segment distribute symmetrically in two ends of the longitudinal centerline of the segment. When working, high frequency alternating magnetic field whose magnetic field lines is through the longitudinal direction of segment is formed under the action of high frequency current, and an eddy current is generated on the surface of mold segments when segments cut magnetic field lines. The temperature of the mold segments rises rapidly by the thermal effect of the eddy current in order to heat the green tire. Since the intensity of the alternating magnetic field around the upper and lower end of the segments is the same, the eddy currents is the same, and the temperature rise on two ends of the segments is consistent. When the middle part of the segment is heated to a certain temperature, the PCM inside absorbs and stores the excess heat, the temperature of the middle part does not change any more, however the temperature on two ends of the segment continues to rise. As a result, the temperature of the middle part of the segment differs from the temperature on two ends of the segment that meet the heat needs of different parts of the tire and ensure cured tire performance.

A technical solution of the present invention includes a plurality of the transverse grooves which distribute symmetrically on both sides of the transverse centerline of the segment are cut on the surface of the supporting plate which is attached with the segment. The electromagnetic coils whose inductance is equal to each other are embedded in grooves. When working, high frequency alternating magnetic field whose magnetic field lines is through the transverse centerline of segment is formed under the action of high frequency current, and an eddy current is generated on the surface of mold segments when segments cut magnetic field lines. The temperature of the mold segments rises rapidly by the thermal effect of the eddy current. Since the intensity of the alternating magnetic field around the upper end and lower end of the segments is the same, the eddy currents is the same, and the temperature rise on two ends of the segments is consistent.

A direct-pressure shaping and electromagnetic induction heating curing apparatus of tires of the present invention comprises an inner mold and a heating device. The inner mold comprises a telescoping mechanism and a transmission mechanism. The telescoping mechanism is divided into types for small segments and large segments. Telescoping mechanisms for small segments comprise the small segments, supporting plates, upper connecting rods, lower connecting rods and short connecting rods. Similarly telescoping mechanisms for large segments comprise large segments, supporting plates, upper connecting rods, lower connecting rods and short connecting rods. The transmission mechanism comprise a base, the inner axle sleeve, outer axle sleeve and the axle-end ring. The small segment and supporting plate are fixedly connected with each other through thread. The supporting plate is connected with the ends of the upper connecting rod and lower connecting rod through hinge joint, and the other end of the upper connecting rod is hinged to the axle-end ring, while the other end of lower connecting rod is hinged on inner axle sleeve. One end of the short connecting rod is hinged to the middle part of lower connecting rod, and the other end is hinged to the base. The large segment is connected with the supporting plate by thread. The supporting plate is connected with ends of the upper connecting rod and the lower connecting rod through hinge, and the other ends of the upper connecting rod and the lower connecting rod are hinged to outer axle sleeve. One end of short connecting rod is hinged to the middle part of lower connecting rod, and the other end is hinged to the base. The piston rod of the central mechanism is through base, the inner axle sleeve, and axle-end ring. Axle-end ring is fixed on the top of the inner axle sleeve by positioning pin. The inner axle sleeve is fixed on the piston rod through the clamping ring and a bolt. The outer axle sleeve is provided with a plurality of guide grooves where hinge supports on the inner axle sleeve can slide up and down.

a heating device comprises two electromagnetic heating elements with the same structure, said elements comprises the electromagnetic coil, the "I" shaped core, the insulation layer and the shell. Electromagnetic coil which winds in the longitudinal direction of said segment winds the "I" shaped core. Said electromagnetic coil is covered with insulation layer. Two electromagnetic heating elements are symmetrically attached to the back of said support plate. Two sets of electromagnetic coils which wind "I" shaped core are made of a wire in series or two wires in parallel. Two sets of electromagnetic coil have the same winding direction and inductance. The inductance of coil on the large segment is greater than that on the small segment.

Maybe the heating device comprises a "U" shaped core, an electromagnetic coil and an insulation layer. A plurality of transverse grooves which distribute symmetrically on both sides of transverse centerline of said supporting plate are cut on the surface of said supporting plate. Said "U" shaped core is embedded in said groove, magnetic poles of said core point to the segment. One end of said each core is winded by electromagnetic coil. Said electromagnetic coils in said supporting plate is made of a wire in series, or two wires in parallel, said each set of electromagnetic coil in said supporting plate has the same winding direction and inductance, the inductance of said coil in the large segment is greater than one in the small segment. An insulation layer lies in between said segment and said supporting plate.

The apparatus of the present invention also includes a cavity filled with phase change material cut in the middle of the segments.

The apparatus of the present invention also includes a copper sleeve on the inner surface of the base and the outer axle sleeve.

The apparatus of the present invention also includes thermocouples fixed on the middle and both sides of the segments.

The apparatus of the present invention also includes a melt pressure sensor installed in the middle of one segment.

The apparatus of the present invention also includes all segments made of steel.

The apparatus of the present invention also includes the supporting plate being composed of non-magnetic metal.

The curing method of the present invention whose curing pressure is thirty percent greater than before can realize uniform distribution of compound, and solve the problem that bladder expands incompletely and asymmetrically, therefore balance and uniformity of tires is improved. The method of the present invention saves energy by electromagnetic induction heating manner and realizes individual control on curing temperature and pressure. In addition, the segments which contain phase change material could support heat according to needs of different parts in tire.

DETAILED DESCRIPTION OF THE INVENTION

Embodiment 1 of the Tire Curing Method of the Present Invention

Figure 11:
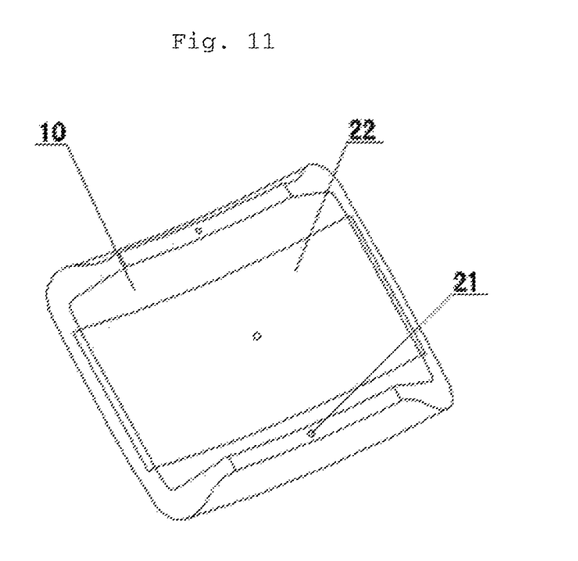
FIG. 11 is a sketch view of large segment with a cavity of the apparatus of the present invention.

Referring to FIGS. 1-5, the curing method of the present invention is to use a metal inner mold to replace the bladder of the central mechanism in the tire vulcanizer. The inner mold comprises N large segments 10, N small segments 1 (N is an integer which is not less than 5. N is 6 in this embodiment), telescoping mechanism and the supporting plates which are attached to segments of the mold. The large segments 10 and the small segments 1 which are alternately arranged in the circumferential direction can expand and contract in the radial direction driven by the telescoping mechanism. The outer contour line of each segment of mold is consistent with the inner contour line of the finished tire. When curing, the mold is in the expanded state, so the large segments 10 and the small segments 1 fit closely together to form a complete circle whose outer diameter is equal to the inner diameter of the finished tire in shape. While unloading, the large segments 10 and the small segments 1 of the mold contract asynchronously, eventually all small segments 1 contract to be within inner circle and the large segments contract to be within the outer circle, wherein the inner circle diameter<the outer circle diameter≤the bead diameter of finished tire. Referring to FIG. 11, cavity with a certain depth is cut in the middle of the segment. Cavity is filled with PCM 22.

Figure 3:
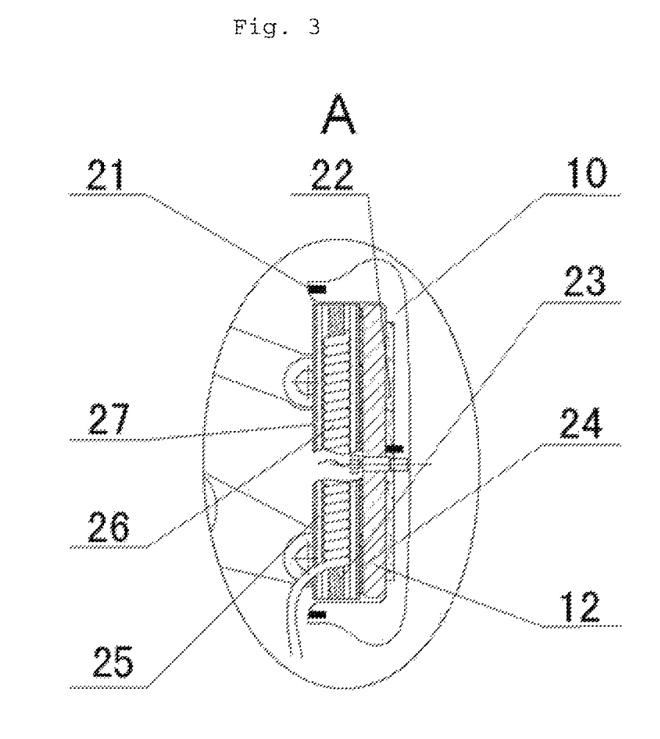
FIG. 3 is a enlarged view of the far right of FIG. 1.
Figure 6:
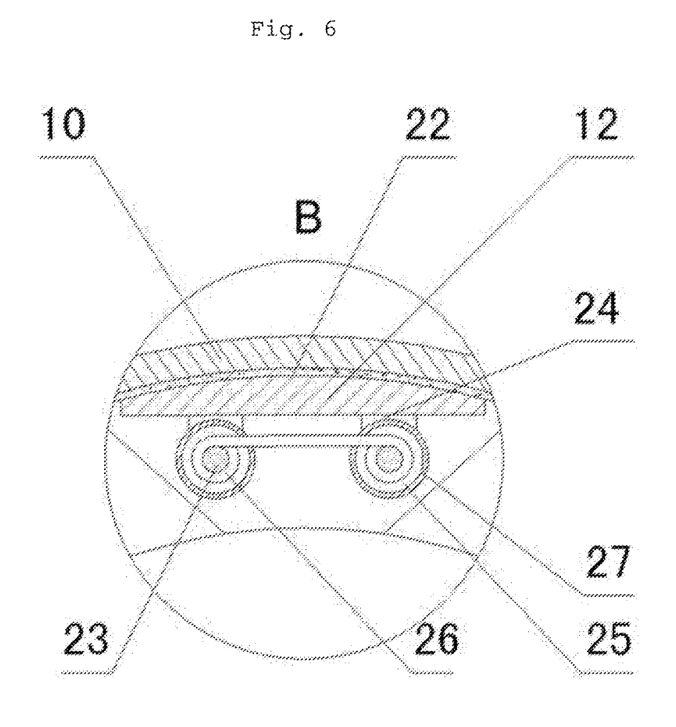
FIG. 6 is a partial enlarged view of FIG. 5.
Figure 7:
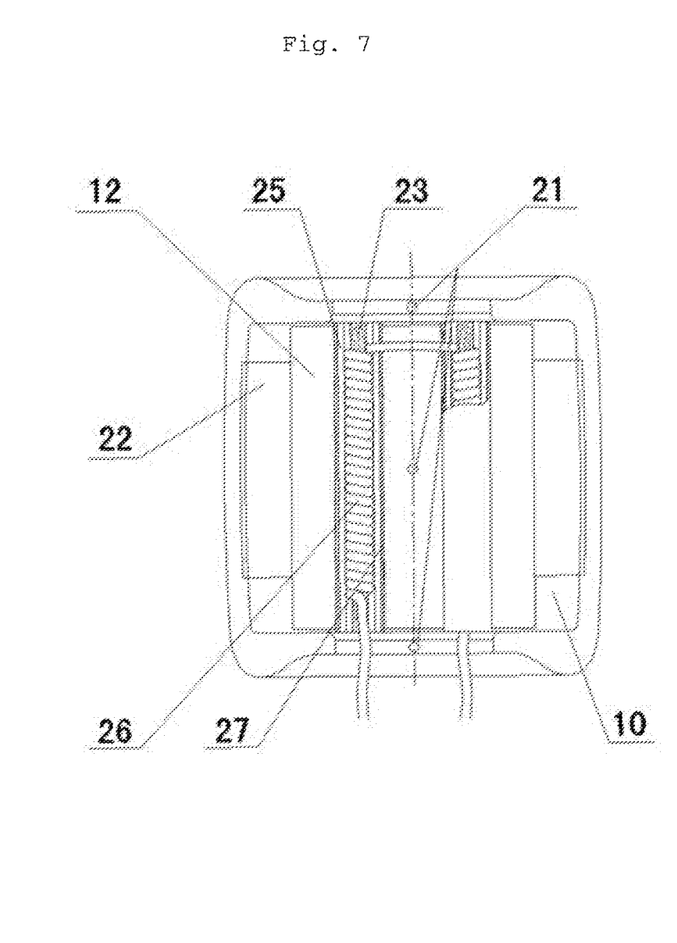
FIG. 7 is a partial sketch view of the apparatus with the device A of embodiment 1 of the present invention.

Referring to FIG. 3, FIG. 6 and FIG. 7, An electromagnetic induction heating method is used to heat the segments of the inner mold. Two sets of electromagnetic coils a 26 which have same inductance are mounted at the back of each segment. The electromagnetic coils a 26 which wind in the longitudinal direction of segment distribute symmetrically in two ends of the longitudinal centerline of the segment. When working, high frequency alternating magnetic field whose magnetic field lines is through the longitudinal direction of segment is formed under the action of high frequency current, and an eddy current is generated on the surface of mold segments when segments cut magnetic field lines. The temperature of the mold segments rises rapidly by the thermal effect of the eddy current in order to heat the green tire 33. Since the intensity of the alternating magnetic field around the upper and lower end of the segments is the same, the eddy currents is the same, and the temperature rise on two ends of the segments is consistent. When the middle part of the segment is heated to a certain temperature, the PCM 22 inside absorbs and stores the excess heat, the temperature of the middle part does not change any more, however the temperature on two ends of the segment continues to rise. As a result, the temperature of the middle part of the segment differs from the temperature on two ends of the segment that meet the heat needs of different parts of the tire and ensure cured tire performance.

Embodiment 2 of the Tire Curing Method of the Present Invention

Figure 8:
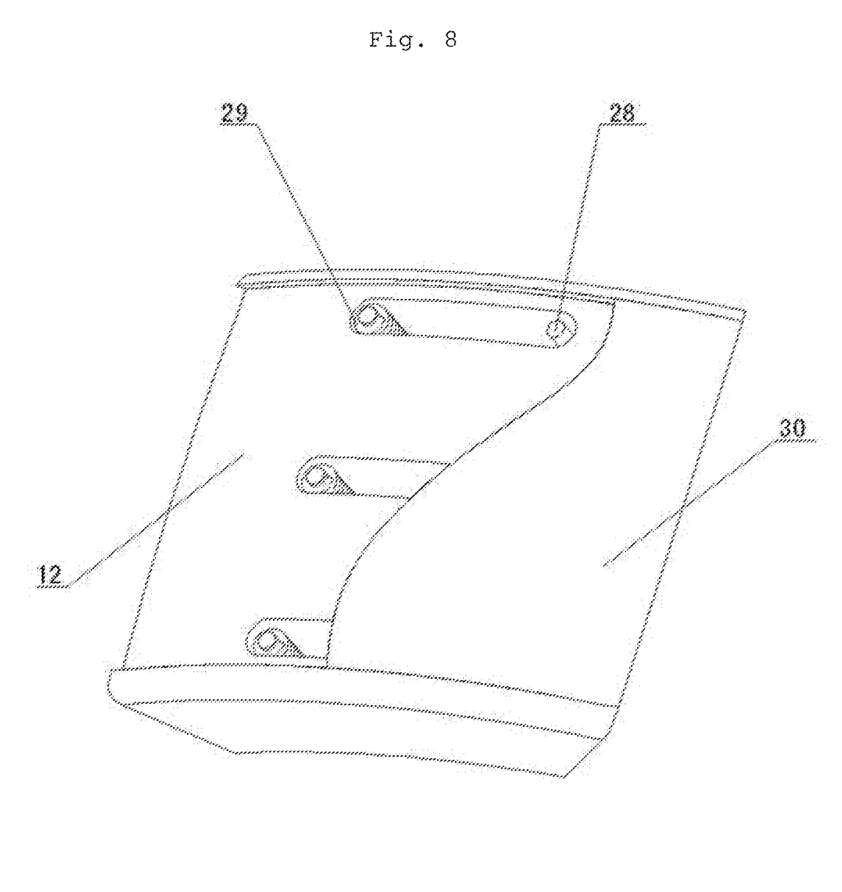
FIG. 8 is a sketch view of the supporting plate of the apparatus with the device B of embodiment 2 of the present invention.
Figure 9:
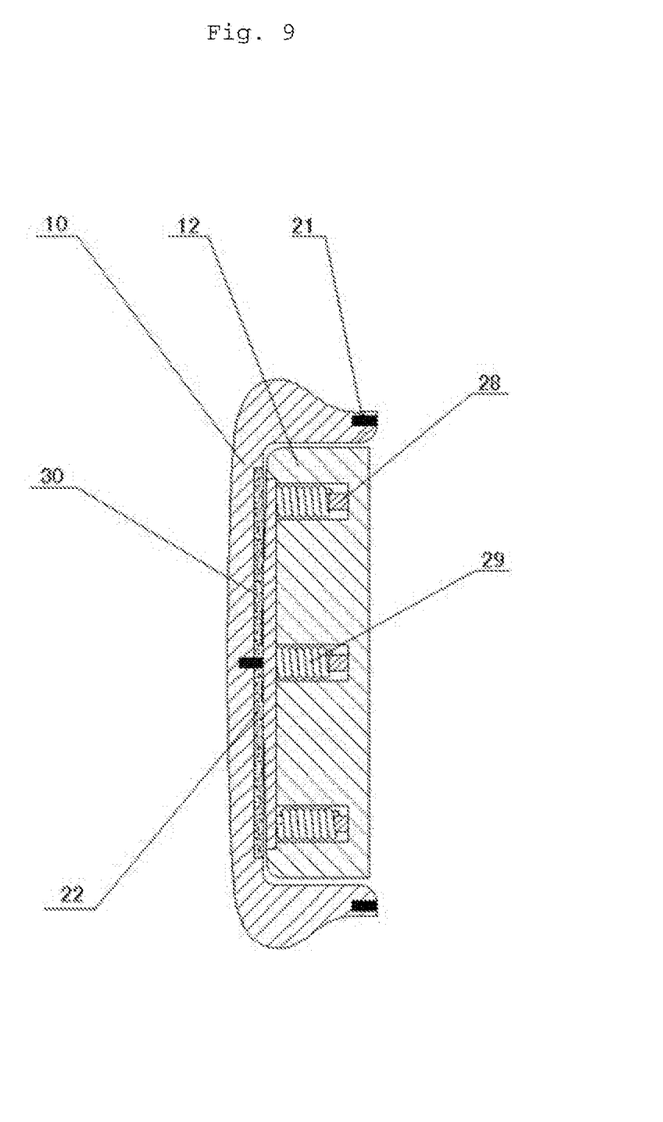
FIG. 9 is a partial section view of the apparatus with the device B of embodiment 2 of the present invention.
Figure 10:
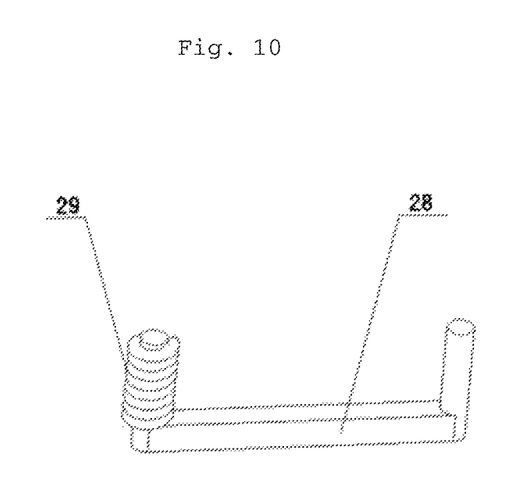
FIG. 10 is a sketch view of "∪" shaped core winded by electromagnetic coil of the apparatus with the device B of embodiment 2 of the present invention.

Referring to FIG. 8-10, the inner mold as depicted in the present embodiment is in accordance with the one in embodiment 1, and the difference is the installation method of electromagnetic coils: a plurality of the transverse grooves which distribute symmetrically on both sides of the transverse centerline of the segment are cut on the surface of the supporting plate which is attached with the segment. The electromagnetic coils b 29 whose inductance is equal to each other are embedded in grooves. When working, high frequency alternating magnetic field whose magnetic field lines is through the transverse centerline of segment is formed under the action of high frequency current, and an eddy current is generated on the surface of mold segments when segments cut magnetic field lines. The temperature of the mold segments rises rapidly by the thermal effect of the eddy current. Since the intensity of the alternating magnetic field around the upper end and lower end of the segments is the same, the eddy currents is the same, and the temperature rise on two ends of the segments is consistent.

Embodiment 1 of the Tire Curing Apparatus of the Present Invention

Figure 2:
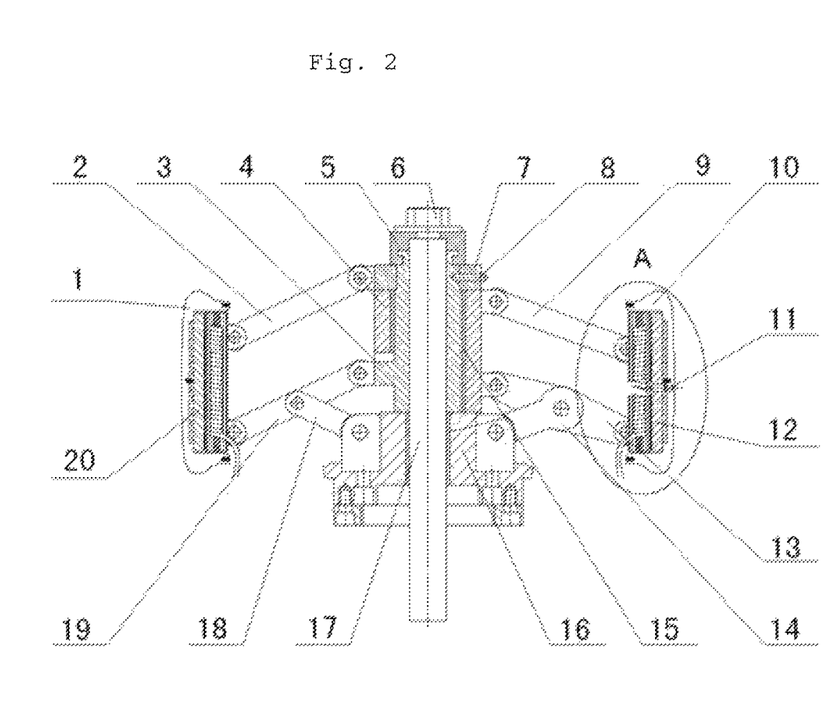
FIG. 2 is a section view of the inner mold A in the expanding state with the device A of embodiment 1 of the present invention.
Figure 4:
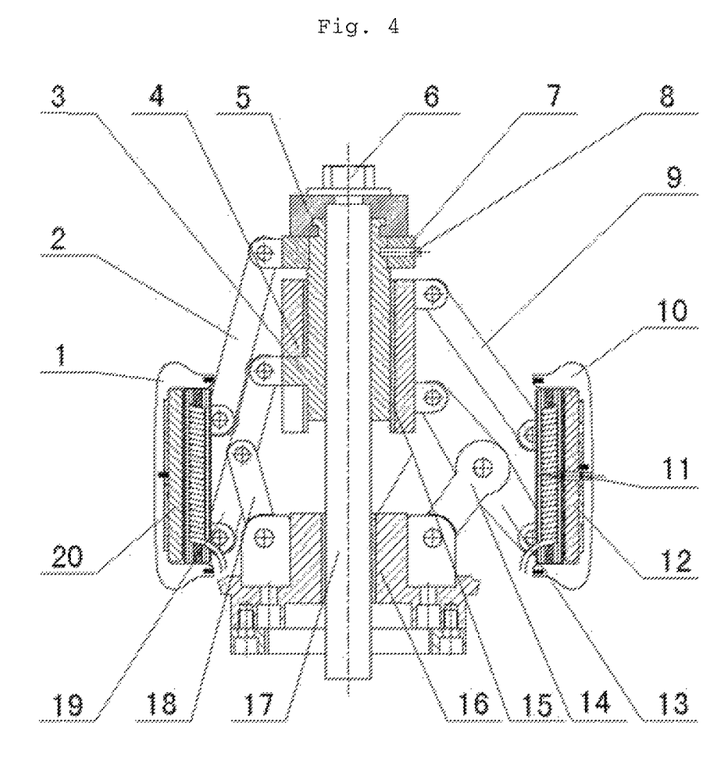
FIG. 4 is a section view of the inner mold in the contracting state with the device A of embodiment 1 the present invention.
Figure 5:
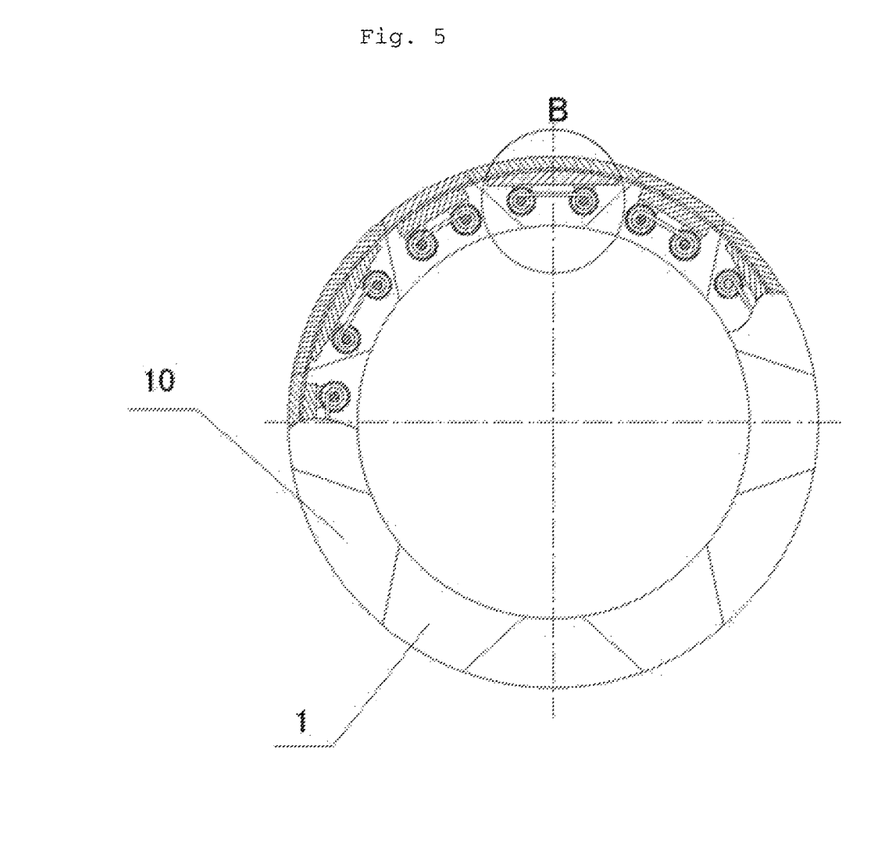
FIG. 5 is a external view of segments in the expanding state with the device A of embodiment 1 of the present invention.

As depicted in FIG. 2 and FIG. 4, the direct-pressure shaping and electromagnetic induction heating curing apparatus of tires of the present invention consists mainly of an inner mold and a heating device A. The inner mold comprises a telescoping mechanism and a transmission mechanism. The telescoping mechanism is divided into types for small segments and large segments. Telescoping mechanisms for small segments comprise the small segments 1, supporting plates 20, upper connecting rods 2, lower connecting rods 19 and short connecting rods 18. Similarly telescoping mechanisms for large segments comprise large segments 10, supporting plates 12, upper connecting rods 9, lower connecting rods 13 and short connecting rods 14. The transmission mechanism comprise a base 16, the inner axle sleeve 3, outer axle sleeve 4 and the axle-end ring 7. The small segment 1 and supporting plate 20 are fixedly connected with each other through thread. The supporting plate 20 is connected with the ends of the upper connecting rod 2 and lower connecting rod 19 through hinge joint, and the other end of the upper connecting rod 2 is hinged to the axle-end ring 7, while the other end of lower connecting rod 19 is hinged on inner axle sleeve 3. One end of the short connecting rod 18 is hinged to the middle part of lower connecting rod 19, and the other end is hinged to the base 16.

The large segment 10 is connected with the supporting plate 12 by thread. The supporting plate 12 is connected with ends of the upper connecting rod 9 and the lower connecting rod 13 through hinge, and the other ends of the upper connecting rod 9 and the lower connecting rod 13 are hinged to outer axle sleeve 4. One end of short connecting rod 14 is hinged to the middle part of lower connecting rod 13, and the other end is hinged to the base 16. The piston rod 17 of the central mechanism is through base 16, the inner axle sleeve 3, and axle-end ring 7. Axle-end ring 7 is fixed on the top of the inner axle sleeve 3 by positioning pin 8. The inner axle sleeve 3 is fixed on the piston rod 17 through the clamping ring 5 and a bolt 6. The outer axle sleeve 4 is provided with a plurality of guide grooves where hinge supports on the inner axle sleeve 3 can slide up and down.

When the inner mold contracts, the base 16 remains motionless while the piston rod 17, the axle-end ring 7 and the inner axle sleeve 3 move upward, to drive the small segments 1 to contract in the radial direction through upper connecting rods 2 and lower connecting rods 19. When the upper surfaces of the hinge supports on the inner axle sleeve 3 touch the upper surfaces of the guide grooves on the outer axle sleeve 4, the outer axle sleeve 4 starts to move upward which drive the large segments 10 to contract in the radial direction through upper connecting rods 9 and lower connecting rods 13. It means that the large segments 10 and small segments 1 act asynchronously. When the mold expands, the piston rod 17 drives the inner axle sleeve 3 and the axle-end ring 7 to move downward, while the outer axle sleeve 4 follows the inner axle sleeve 3 to fall downward. When the lower surface of the outer axle sleeve 4 contacts with the base 16, the large segments 10 get to the limiting position while the inner axle sleeve 3 continues to move downward driven by the piston rod 17. When the lower surface of the inner axle sleeve 3 contacts with the base 16, small segments 1 get to the extreme position.

Referring to FIG. 11, a cavity with a depth of 2-5 mm is cut in the middle of the segments. The cavity is filled with PCM 22 such as the solid inorganic salt with a 150° C. transition temperature. All segments are made of steel with high content of iron element. A 2 mm thick copper sleeve 15 is on the inner surface of the base 16 and the outer axle sleeve 4 to prevent the mechanism from being stuck because of high temperature during curing process. The supporting plate is composed of non-magnetic metal, such as stainless steel 304. The thermocouples 21 are fixed on the middle and both sides of the segments to monitor the surface temperature of segments in real time. Moreover, a melt pressure sensor 11 is installed in the middle of one segment to measure curing pressure in real-time.

Referring to FIG. 3, FIG. 6 and FIG. 7, said heating device A comprises two electromagnetic heating elements with the same structure, said elements comprises the electromagnetic coil a26, the "|" shaped core 23, the insulation layer a25 and the shell 27. Electromagnetic coil a26 which winds in the longitudinal direction of said segment winds the "|" shaped core 23. Said electromagnetic coil a26 is covered with insulation layer a25 made of asbestos. The shell 27 is made of a non-magnetic metal, such as stainless steel 304, said "|" shaped magnetic core 23 is made of ferrite with high magnetic permeability or microcrystalline alloy materials. Two electromagnetic heating elements are symmetrically attached to the back of said supporting plate by silica gel 24. Two sets of electromagnetic coils a26 which wind "|" shaped core 23 are made of a wire in series or two wires in parallel. Two sets of electromagnetic coil a26 have the same winding direction and inductance. Since the volume of the large segment 10 is larger than the volume of the small segments, the inductance of coil a26 on the large segment 10 is 15 µH~25 µH greater than that on the small segment.

When working, high frequency alternating magnetic field whose magnetic field lines is through the longitudinal direction of segment is formed under the action of high frequency current, and an eddy current is generated on the surface of mold segments when segments cut magnetic field lines. The temperature of the mold segments rises rapidly by the thermal effect of the eddy current in order to heat the green tire 33. Since the intensity of the alternating magnetic field around the upper and lower end of the segments is the same, the eddy currents is the same, and the temperature rise on two ends of the segments is consistent. When the middle part of the segment is heated to a certain temperature, the PCM 22 inside absorbs and stores the excess heat, the temperature of the middle part does not change any more, however the temperature on two ends of the segment continues to rise. As a result, the temperature of the middle part of the segment differs from the temperature on two ends of the segment that meet the heat needs of different parts of the tire and ensure cured tire performance.

Embodiment 2 of the Tire Curing Apparatus of the Present Invention

See FIG. 8-10, the tire direct-pressure shaping and electromagnetic induction heating curing apparatus of the present invention comprises an inner mold which is in accordance with the one in embodiment 1 and a heating device B. Said heating device B comprises a "U" shaped core 28, an electromagnetic coil b 29 and an insulation layer b 30. A plurality of transverse grooves which distribute symmetrically on both sides of transverse centerline of said supporting plate are cut on the surface of said supporting plate (the number of grooves in the present embodiment is 3). Said "U" shaped core 28 which is made of ferrite with high permeability or microcrystalline alloy material is embedded in said groove, magnetic poles of said core point to the segment. One end of said each core is winded by electromagnetic coil b 29. Said electromagnetic coils b 29 in said supporting plate is made of a wire in series, or two wires in parallel, said each set of electromagnetic coil b 29 in said supporting plate has the same winding direction and inductance. Since the volume of the large segment 10 is larger than the volume of the small segment 1, the inductance of said coil b 29 in the large segment 10 is 15 µH~25 µH greater than one in the small segment. Said insulation layer b 30 made of asbestos lies in between said segment and said supporting plate. When working, high frequency alternating magnetic field whose magnetic field lines is through the transverse direction of segment is formed under the action of high frequency current, and an eddy current is generated on the surface of mold segments when segments cut magnetic field lines. The temperature of the mold segments rises rapidly by the thermal effect of the eddy current in order to heat the green tire 33. Since the intensity of the alternating magnetic field around the upper and lower end of the segments is the same, the eddy currents is the same, and the temperature rise on two ends of the segments is consistent.

Tire manufacturing steps based on the direct-pressure shaping and electromagnetic induction heating curing method of the present invention.

(1) loading: said inner mold is in the contracted state at this point, and there is a certain distance between steel ring 34 of said outer mold and said base 16 in order to ensure that the segments don't interfere with said steel ring 34 when the inner mold expands or contracts. The green tire 33 whose longitudinal centerline aligns with that of the central mechanism is held by manipulator.

(2) shapings: the piston rod 17 of the central mechanism moves downward, which drives the segments gradually expand through the connecting rods. Said piston rod 17 moves until all segments get to the limiting position, and the tire 33 is shaped. Then the central mechanism with the tire 33 move down until said base 16 touches steel ring 34.

Figure 1:
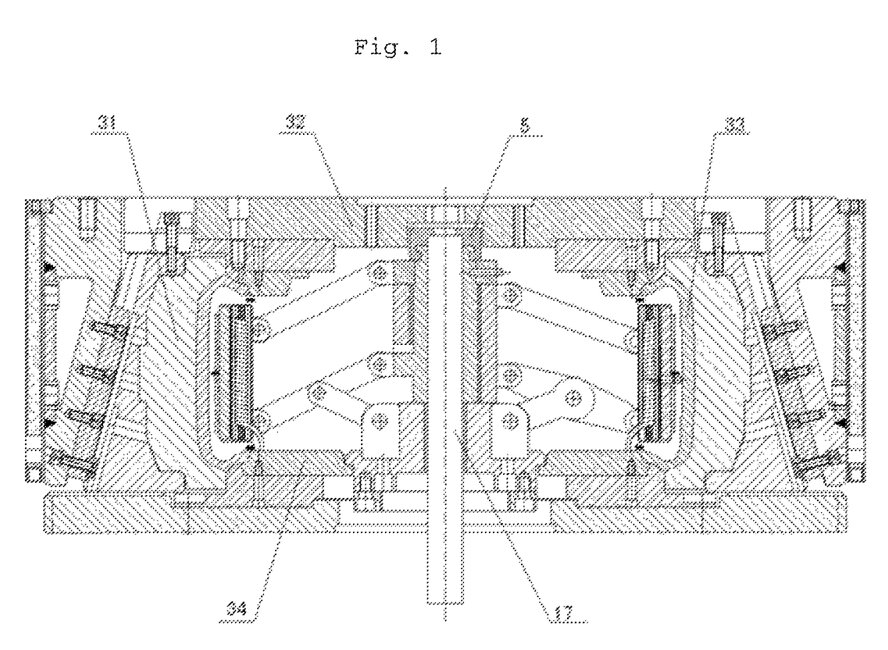
FIG. 1 is a sketch view of apparatus clamping of the present invention.

(3) clamping: as shown in FIG. 1, the central mechanism is limited by the cover 32 of the outer mold, which prevent the piston rod 17 from rising caused by pressure which the green tire 33 supports for said segments.

(4) unloading: the central mechanism with the finished tire move upward until lower sidewall of the said finished tire is higher than the steel ring 34, then the large and small segments contract asynchronously driven by the piston rod 17 though the inner axle sleeve 3, outer axle sleeve 4 and the connecting rods. Tire can be unloaded when all the segments contract to within the bead.

What is claimed is:

1. A method of direct-pressure shaping and electromagnetic induction heating curing of a tire, the method comprising the steps of:

expanding a plurality of large segments and a plurality of small segments of an inner mold mounted on a central mechanism of a tire curing press in a radial direction using a telescoping mechanism attached to a supporting plate for each of the segments, the large segments and the small segments arranged to form a complete circle whose outer diameter is equal to an inner diameter of the tire in an uncured state, an outer contour line of each of the segments of the inner mold being consistent with an inner contour line of the tire in a finished state, the large segments being larger than the small segments;

electromagnetic induction heating to cure the tire using two electromagnetic coils having a same inductance mounted on the supporting plate for each of the segments, the electromagnetic coils winding in a longitudinal direction of the segments, the electromagnetic coils symmetrically distributing, on both sides of a longitudinal centerline of the segments, a high frequency alternating magnetic field formed under high frequency current application to the coils with magnetic field lines extending through the longitudinal direction of the segments, and generating an eddy current on a surface of the segments intersecting the magnetic field lines; and asynchronously contracting the large segments and the small segments, the small segments contracting to be within an inner circle and said large segments contracting to be within an outer circle, wherein a diameter of the inner circle is less than a diameter of the outer circle and is less than or equal to a bead diameter of the tire, wherein an intensity of said alternating magnetic field around an upper and a lower end of the segments being the same so that the eddy currents are the same, and the temperature rise on both sides of the segments are consistent, and wherein each of the segments include a cavity filled with a phase change material located in a middle part of each of the segments and adjacent the supporting plate, and when the middle part of each of the segments is heated to a certain temperature, the phase change material absorbs and stores excess heat, preventing a temperature of the middle part of the segments from changing further, and allowing a temperature at the upper and lower ends of the segments to continue to rise, creating a temperature difference between the middle part of each of the segments and the lower and upper ends of the segments.

2. The method of claim 1, wherein the electromagnetic coils are embedded in grooves formed in the supporting plate for each of the segments.

\* \* \* \* \*